United States Patent Office 3,020,207
Patented Feb. 6, 1962

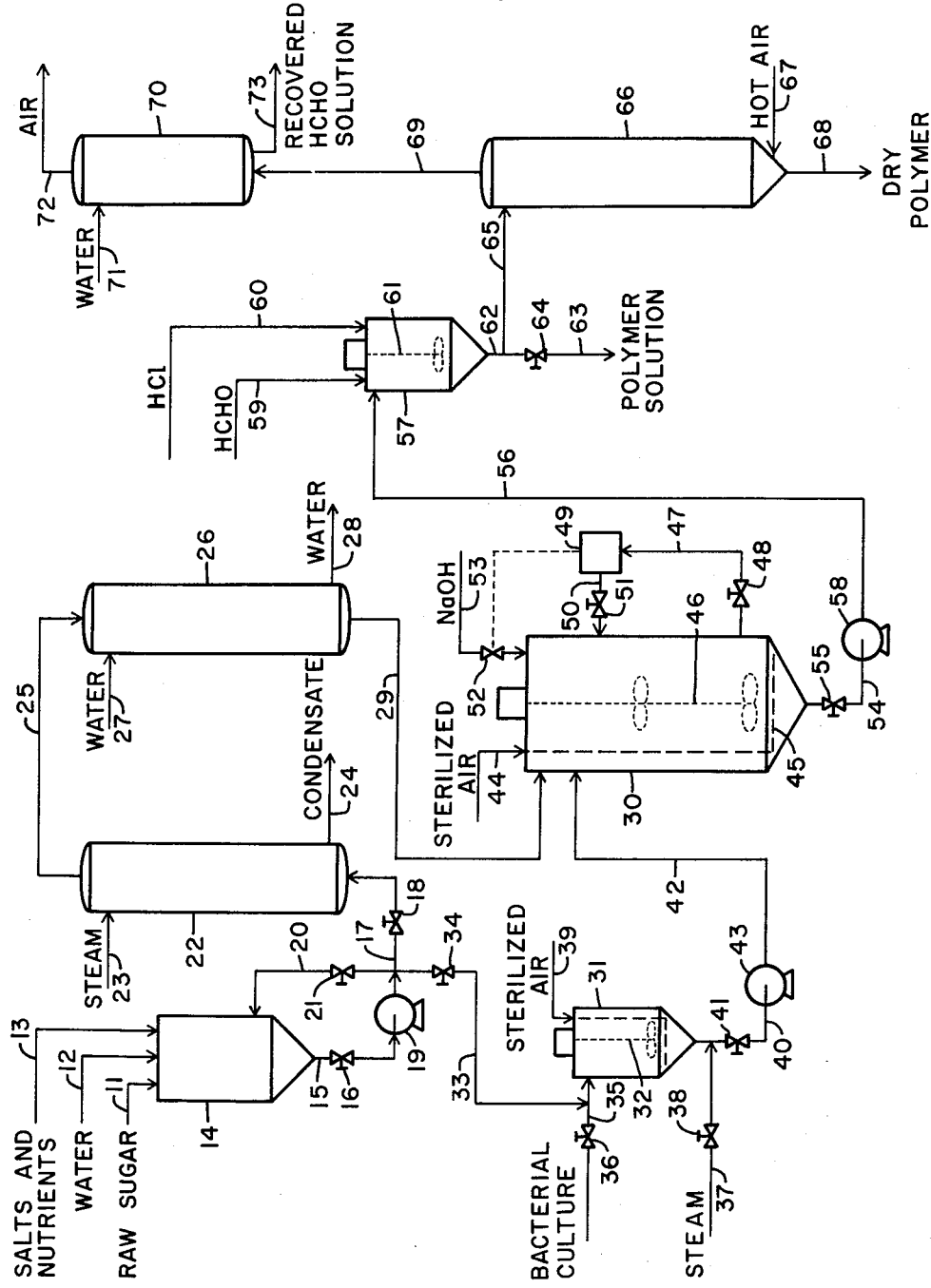

3,020,207
THICKENING AGENT AND PROCESS FOR
PRODUCING SAME
John T. Patton, Tulsa, Okla., assignor to Jersey Production Research Company, a corporation of Delaware
Filed May 27, 1960, Ser. No. 32,241
16 Claims. (Cl. 195—31)

The present invention relates to compositions useful for increasing the viscosities of aqueous media and more particularly relates to an improved water-soluble thickening agent which is more stable than thickeners available heretofore. In still greater particularity, the invention relates to a substituted heteropolysaccharide which has greater resistance to degradation at elevated temperatures than materials used in the past for thickening aqueous media.

Attention has been focused upon the development of more effective compositions for thickening aqueous media in recent years, largely because of widespread interest in the use of such compositions in secondary recovery operations carried out in the petroleum industry. Field tests have shown that the use of viscous solutions in place of the water or brine normally employed in waterflooding projects results in a significant increase in the amount of oil which can be displaced from a subsurface reservoir during such a project. The principal reason for this is the fact that water, because its viscosity is much lower than that of the oil in such a reservoir, tends to finger through the more permeable zones of the reservoir during the waterflooding and thus bypasses much of the oil contained therein. The use of water containing thickening agents in concentrations sufficient to give viscosities more nearly equivalent to that of the oil reduces this fingering tendency and promotes more uniform, piston-like displacement of the oil. It has been estimated that the use of thickened water in waterflooding projects carried out in the past would have increased the total amount of oil recovered as a result of such projects by a factor of at least 25 percent.

To date the principal obstacle to the widespread use of viscous solutions during waterflooding has been the lack of a suitable thickening agent. A variety of polymers, gums and resins have been advocated as useful for preparing such solutions but tests of these materials have demonstrated almost without exception that they are unsatisfactory. For the most part, the materials proposed in the past are relatively expensive and must be used in concentrations which make the cost prohibitive. Solutions of many such materials tend to plug the pore spaces of the permeable rock which makes up most subsurface oil reservoirs and hence would not be satisfactory even if their use were economically feasible. Other materials advocated in the past have poor stability at elevated temperatures and tend to break down under temperature conditions prevailing in most oil reservoirs. Many thickeners suggested heretofore readily react with calcium and other cations found in oil reservoirs to form insoluble precipitates. Still other materials are adsorbed upon rock surfaces to such an extent that viscous solutions containing them lose their viscosity almost as soon as they are injected into the reservoir. The stringent requirements for a thickening agent to be used in waterflooding thus almost entirely rule out water thickeners suggested by the prior art.

The present invention provides a new and improved composition for use as a water thickener which is characterized by exceptional stability and is almost entirely free of the disadvantages which have precluded the use of thickeners advocated in the past in waterflooding operations. In accordance with the invention, it has now been found that certain substituted heteropolysaccharides prepared by the fermentation of carbohydrates with organisms of the genus Xanthomonas and the subsequent reaction of the product with an aldehyde are quite stable at elevated temperatures, can readily be injected into a permeable reservoir without plugging, are relatively inert to the effects of calcium and other polyvalent cations, and are not adsorbed to any appreciable extent upon the porous rock which makes up most oil reservoirs. The compositions of the invention are considerably less expensive than other water thickeners and are effective in much lower concentrations than thickeners available in the past. These characteristics make the substituted heteropolysaccharides of the invention eminently suitable for use as water thickeners in secondary recovery operations and in other applications where highly stable, inexpensive thickeners effective in low concentrations are required.

The heteropolysaccharides which are modified in accordance with the invention by reacting them with an aldehyde to form substituted compounds are fermentation products produced by the action of bacteria of the genus Xanthomonas upon carbohydrates. Representative species of these bacteria include Xanthomonas campestris, Xanthomonas phaseoli, Xanthomonas malvacearum, Xanthomonas carotae, Xanthomonas translucens, Xanthomonas hederae, Xanthomonas papavericola, Xanthomonas begoniae and Xanthomonas incanae. Studies have shown that the production of the heteropolysaccharides is a characteristic trait of members of the genus Xanthomonas but that certain Xanthomonads synthesize such heteropolysaccharides with particular efficiency and are therefore more attractive for purposes of the invention than are others. Xanthomonas campestris, Xanthomonas begoniae and Xanthomonas incanae are outstanding in this respect and hence are preferred species.

A variety of carbohydrates may be fermented by means of the Xanthomonas organisms to produce the heteropolysaccharides. Suitable carbohydrates include glucose, sucrose, fructose, maltose, lactose, galactose, soluble starch, corn starch and the like. Since such carbohydrates need not be in a refined state, many crude products having a high carbohydrate concentration may be utilized. Specific examples include raw sugar, crude molasses and the like. Unrefined carbohydrate sources such as these are normally much less expensive than the refined products and are therefore preferred for purposes of the invention.

The heteropolysaccharide is normally produced from the carbohydrates described above by employing an aqueous fermentation medium containing from about 1 to about 5 percent by weight of a suitable carbohydrate, from about 0.01 to about 0.5 percent by weight of dipotassium acid phosphate, and from about 0.1 to about 10 percent by weight of a nutrient including organic nitrogen sources and appropriate trace elements. The nutrient utilized will normally be a by-product material such as distillers' solubles. "Stimuflav," marketed by Hiram Walker & Sons, is a commercially marketed nutrient prepared from distillers' solubles. A mixture containing 2 weight percent raw sugar, 0.1 weight percent dipotassium acid phosphate and 0.5 weight percent "Stimuflav" has been found to yield particularly good results. It will be understood that fermentation media containing other ingredients may be most effective when the ingredients are combined in slightly different proportions.

The fermentation reaction is carried out by first sterilizing a medium of the type described above and then inoculating it with organisms of the genus Xanthomonas. Sterilized air is bubbled through the medium to provide aerobic conditions. The medium is permitted to ferment at a temperature between about 70° F. and about 100° F., preferably between about 75° F. and about 85° F., for a period of from two to three days. During the incubation period, the viscosity of the fermenting mixture rapidly increases due to formation of the heteropolysaccharide. After the viscosity has reached a value of 70 centipoises or higher, as determined by testing this fermentate with a Brookfield viscometer in 1:6 dilution with distilled water, the reaction may be halted. In a well controlled process, this point is normally reached after about 48 hours. The pH of the solution should be regulated during fermentation in order to obtain maximum production of the heteropolysaccharide. Sodium hydroxide or a similar base can be added to the solution at intervals and in amounts sufficient to maintain pH at a level above about 6, preferably above about 6.5. Upon completion of the fermentation reaction, the crude polymer can be separated from the bacterial cells by centrifugation or filtration if desired. Precipitation with methanol, ethanol, acetone or a similar reagent permits isolation of relatively pure heteropolysaccharide. This latter step is not essential in the preparation of the improved thickening agent of the invention, however, and is therefore generally omitted.

The heteropolysaccharide produced as described above is obtained as a thick viscous solution having a dull yellow color. Tests and analyses have shown that the heteropolysaccharide itself is a polymer containing mannose, glucose, glucuronic acid salts and acetyl radicals in a molar ratio of about 2:1:1:1 respectively. Also present in lesser amounts are about 5.5 weight percent of inorganic materials plus about 0.15 weight percent each of phosphorous and nitrogen. The relatively pure heteropolysaccharide is a soft, bulky powder slightly tinted by colored materials from the culture medium. It swells rapidly in the presence of small amounts of water to form a soft gel and is readily soluble in larger quantities of water.

The heteropolysaccharide obtained in the manner set forth in the preceding paragraphs is converted into the improved thickening agent of the invention by treating it with an excess of an aldehyde under controlled conditions. Suitable aldehydes are those containing from 1 to about 4 carbon atoms per molecule, such as formaldehyde, acetaldehyde, propionaldehyde, butyraldehyde and isobutyraldehyde. Of these, formaldehyde is preferred because of its low cost and ready availability.

Reaction of the heteropolysaccharide and aldehyde is carried out by first adding an excess of the aldehyde to an aqueous solution containing the heteropolysaccharide. It is normally preferred to employ the crude heteropolysaccharide solution recovered from the fermentation step for this purpose but an aqueous solution containing purified heteropolysaccharide in a concentration between about 0.1 percent and about 3 percent by weight may be prepared and used if desired. The aldehyde is added to the polymer solution in a concentration between about 0.5 percent and about 50 percent, based upon the weight of the total solution. The reaction solution is then mixed and heated to a temperature in excess of about 150° F., preferably between about 175° F. and 250° F. The solution is held at this temperature for a period of from about one minute to about 15 minutes or more, after which it is cooled. It has been found that the speed of the reaction can be accelerated by adding a small quantity, normally about 0.001 percent to about 0.1 percent by weight, of a mineral acid to the solution as a catalyst prior to heating. It is preferred to utilize hydrochloric acid for this purpose but sulfuric acid, nitric acid or the like may be used. Although contact of the heteropolysaccharide with an aldehyde under the conditions described produces little change in the physical appearance of the polymer solution, infrared analysis has shown that the product is a substituted heteropolysaccharide and not merely a mixture.

The substituted heteropolysaccharide solution produced in the manner set forth above may be stored in liquid form for subsequent use as a thickening agent or may instead be dehydrated and packaged in dry form for future use or shipment. It is normally preferred to dehydrate the solution in a spray dryer or similar equipment and to recover excess aldehyde not reacted with the heteropolysaccharide. This lowers the aldehyde cost in the process and reduces the expense of shipping the finished product.

The exact nature and objects of the invention can be more fully understood by referrinng to the following detailed description of a specific process for manufacturing the substituted heteropolysaccharide and to the accompanying drawing which illustrates that process.

Turning now to the drawing, raw cane sugar is introduced into the system shown through line 11 from a suitable source. Water is introduced through line 12. Dipotassium acid phosphate and a bacteria nutrient, distillers' solubles for example, are added through line 13. These constituents are combined in mixing tank 14 in proportions to produce a fermentation medium containing about 2 percent by weight of raw sugar, about 0.1 percent by weight of dipotassium acid phosphate and about 0.5 percent by weight of distillers' solubles. The medium thus prepared is withdrawn from the mixing tank through line 15 containing valve 16 and is pumped through line 17 and valve 18 into the sterilization stage of the process by means of pump 19. A recycle line 20 containing valve 21 is provided to permit the recirculation of liquid discharged by the pump into the feed tank if desired.

The sterilization unit employed in the process comprises a heat exchanger, a jacketed vessel, a vat provided with an electrical heater or similar apparatus 22 within which the fermentation medium can be heated to a temperature of from about 200 to about 275° F. and held at that temperature for a period of from about 2 to about 5 minutes or longer. Higher temperatures and longer residence times may be employed if desired but in general the temperatures and times indicated will be sufficient to kill any bacteria present in the fermentation medium and render it sterile. As shown in the drawing, the sterilization unit consists of a heat exchanger into which steam is introduced through line 23 and from which condensate is withdrawn through line 24.

Sterile fermentation medium is withdrawn from the sterilization unit at a temperature between about 200° F. and about 275° F. through line 25 and is passed into cooling unit 26. The cooling unit depicted in the drawing is a heat exchanger into which water or a similar cooling fluid is introduced through line 27 and subsequently withdrawn therefrom through line 28. A jacketed vessel, a vat containing cooling coils or other conventional cooling apparatus may be utilized in lieu of such a heat exchanger. The feed temperature is dropped in the cooling unit to a point between about 70° F. and about 100° F., preferably to a temperature between about 75° F. and about 85° F. The cooled, sterile medium is then discharged through line 29 into fermentation vessel 30.

An inoculum containing *Xanthomonas campestris* organisms or similar bacteria is introduced into the fermentation vessel to effect the fermentation reaction. The inoculum is prepared and stored in preparation tank 31 provided with an agitator 32. In the system shown in the drawing, the preparation tank is connected to mixing tank 14 by line 33 containing valve 34 in order to permit the transfer of fermentation medium from the mixing tank to the inoculum preparation tank. The bacteria culture may be added to the preparation tank through line 35 containing valve 36. The inoculum is prepared by permitting the bacteria to grow upon a small amount of fermentation medium previously sterilized within the preparation tank by bubbling steam into it through line 37 containing valve 38. Sterilized air necessary for growth of the bacteria is introduced into the preparation tank through line 39. The fermenting medium is provided with gentle agitation during the incubation period. The rate at which the inoculum is produced is controlled in order to maintain a steady supply for use in the main fermentation process. The inoculum thus prepared is withdrawn from the preparation tank through line 40 containing valve 41 and is passed through line 42 into the fermentation vessel 30 by means of pump 43.

Sterilized air is introduced into the fermentation vessel 30 through line 44 in order to provide the aerobic conditions necessary for fermentation of the sterile medium by the bacteria. A sparger, distribution plate or similar device 45 is located in the lower part of the fermentation vessel in order to assure effective contact between the air and the fermentation medium. Gentle agitation is provided by propeller agitator 46. As fermentation occurs, the pH of the medium will normally decrease due to the production of an acid product by the bacteria. To control this, a portion of the medium is circulated through line 47 containing valve 48 into a conventional pH meter 49 and is thereafter returned to vessel 30 through line 50 containing valve 51. The pH meter is electrically connected to an automatic valve 52 which serves to control the addition of sodium hydroxide or a similar base to the fermentation vessel. The pH of the fermentation medium is thus continuously held between about 6 and about 7.5, preferably between about 6.5 and about 7.2. The amount of sodium hydroxide added through line 53 in order to hold the pH at this level will depend upon the concentration of the base, the volume of fermentate and the stage of the fermentation process. In lieu of an external pH meter as shown in the drawing, an electrode assembly suitable for direct immersion in the fermentation vessel may be utilized. Commercial pH recording and controlling equipment suitable for use in the process of the invention is available from a number of sources and will be familiar to those skilled in the art. In some cases the pH of the fermentation medium may also be controlled by means of a buffer solution incorporated into the medium. A solution of $K_2HPO_4$, for example, may be employed for this purpose.

Fermentation in vessel 30 is normally carried out for a period of from 2 to 3 days or longer. At the end of this period, an aqueous solution of heteropolysaccharide formed by the action of the bacteria upon the sugar is withdrawn from vessel 30 through line 54 containing valve 55. The solution thus withdrawn normally contains from about 0.5 to about 4 weight percent of the heteropolysaccharide and generally has a viscosity between about 500 and about 50,000 centipoises. The viscous solution is passed through line 56 into reaction vessel 57 by means of pump 58. A solution of formaldehyde or a similar low molecular weight aldehyde containing from 1 to about 4 carbon atoms per molecule is added to the reaction vessel through line 59 in an amount sufficient to give an aldehyde concentration of from about 0.5 weight percent to about 50 weight percent, based on the total solution. From about 0.001 percent by weight to about 1.0 percent by weight of a hydrochloric acid solution or a similar mineral acid is added to the reaction vessel through line 60. Agitator 61 provides efficient mixing of the materials. The mixture thus prepared is heated to a temperature in excess of about 175° F. by means of steam coils or an electrical heater not shown and is held at that temperature for a period of from about 1 minute to about 15 minutes in order to promote reaction of the formaldehyde with the heteropolysaccharide. The reaction product is withdrawn from vessel 57 through line 62.

The substituted heteropolysaccharide prepared as described in the preceding paragraph may be withdrawn from the system through line 63 containing valve 64 and transferred to drums or other containers for use in the form of a solution. It may instead be transferred through line 65 and introduced into spray dryer 66 for the preparation of a solid product. In the spray dryer the solution is contacted with a rising stream of heated air introduced through line 67 and is recovered through line 68 as a soft, fluffy powder having a slight yellowish tint. The exhaust air from the dryer passes through line 69 into aldehyde recovery unit 70. Here the air is scrubbed by means of water introduced through line 71 and is withdrawn overhead through line 72. Water containing formaldehyde is withdrawn from the system through line 73. This may be distilled to recover the formaldehyde if desired. The substituted heteropolysaccharide powder recovered from the dryer may be bagged for future use or may be further processed for the preparation of other products.

It will be understood that the foregoing description and accompanying drawing are directed to a specific process for preparing the improved thickening agent of the invention and that the invention itself is not limited to the precise reactants and apparatus described. The process depicted in the drawing is essentially a batch-type operation. Such a process can obviously be converted into a continuous one by continually introducing sterile medium and withdrawing fermentate from the fermentation vessel and by making other minor modifications. It will be recognized that instrumentation, steam lines and other features conventional in a process such as that described above have not been set forth in full detail. Such features will be familiar to those skilled in the art and need not be specifically described in order to permit a full understanding of the invention.

The process of the invention can be further illustrated by referring to the results obtained in a series of experiments wherein substituted heteropolysaccharides were prepared in accordance with the invention and tested to determine their effectiveness as compared with that of other thickening agents.

In the first of these experiments, a fermentation medium containing 2.0 weight percent of raw sugar, 0.1 weight percent of dipotassium acid phosphate and 0.05 weight percent of "Stimulflav," a commercial bacteria nutrient prepared from distillers' solubles, was prepared. After sterilization and cooling, this medium was inoculated with *Xanthomonas campestris* organisms and fermented under aerobic conditions at a temperature of about 75° F. Upon completion of the fermentation reaction after about 72 hours, a viscous heteropolysaccharide solution was obtained. This solution was then divided into two portions. One portion was used as a control, while the other was reacted with formaldehyde to produce the substituted heteropolysaccharide of the invention. Reaction of the heteropolysaccharide solution with formaldehyde was carried out by adding 80 grams of a 40 percent formaldehyde solution to 80 grams of heteropolysaccharide solution containing about 5 grams of polymer. The reactants were throughly mixed and about 0.6 weight percent of concentrated hydrochloric acid solution was added as a catalyst. The mixture was then heated to a temperature of about 212° F. and was held at that temperature for a period of about 15 minutes. The reaction mixture was boiled under vacuum to remove unreacted formaldehyde and then cooled to room temperature.

Samples of the heteropolysaccharide treated with formaldehyde as described above and the control heteropolysaccharide solution were analyzed by means of an infrared spectrometer. The absorption curves for the two samples contained peaks as shown in the following table.

Table I
INFRARED ABSORPTION PEAKS

| I<br>Heteropolysaccharide from *Xanthomonas campestris* | II<br>Heteropolysaccharide I After Modification by Reaction with HCHO |
|---|---|
| Microns | Microns |
| 3 | 3 |
| 3.4 | 3.4 |
| 5.8 | 5.8 |
| 6.2 | 6.2 |
| 7.1 | 7.1 |
| 7.3 | 7.3 |
| 7.8 | 7.8 |
| 8.1 | 8.1 |
| 8.6–10.2 | 8.6–10.2 |
| -- | 10.7 |
| 11.3 | -- |
| 12.3–12.8 | 12.3–12.8 |

The infrared data set forth in the above table clearly demonstrate that the chemical structure of the heteropolysaccharide treated with formaldehyde differed from that of the control heteropolysaccharide solution. The prominent peaks at 10.7 microns in one case and at 11.3 microns in the other case indicate that the treated material was not simply a mixture of the heteropolysaccharide and formaldehyde and that instead a reaction product having a characteristic chemical structure was obtained. It is thus apparent that treatment of the heteropolysaccharide with an aldehyde produces a new composition of matter having properties unlike those of the basic heteropolysaccharide polymer.

To compare the thermal stability of the substituted heteropolysaccharide with that of the control polymer, solutions of each of the materials in a concentration of about 0.1 weight percent in brine containing 28,000 p.p.m. of sodium chloride were prepared. The viscosity of each solution at a temperature of 80° F. was measured by means of a Brookfield viscometer and recorded. The solutions were then heated to a temperature of 150° F. in a thermostatically-controlled oven and held at that temperature for a period of 22 days. Viscosity measurements were made at 80° F. at intervals during this period. The results obtained are shown in Table II below.

Table II
EFFECT OF AGING AT ELEVATED TEMPERATURE UPON VISCOSITIES OF HETEROPOLYSACCHARIDE SOLUTIONS

| Aging Period, Days at 150° F. | Viscosity in Centipoises at 80° F. | |
|---|---|---|
|  | Control Heteropolysaccharide | Substituted Heteropolysaccharide |
| 0 | 32.8 | 33.4 |
| 1 | 30.4 | -- |
| 5 | -- | 31.4 |
| 7 | 20.0 | -- |
| 22 | 9.0 | 30.2 |

From the above table it can be seen that the heteropolysaccharide-formaldehyde reaction product was significantly more stable during storage at 150° F. than was the unreacted heteropolysaccharide used as a control. After 22 days the viscosity of the solution containing the control heteropolysaccharide had decreased to less than a third of its initial value. That of the solution containing the substituted heteropolysaccharide, on the other hand, had decreased only slightly. The high salinity of the solution had little apparent effect upon the stability of the substituted polymer. The improved stability thus obtained is an important factor in determining the usefulness of the heteropolysaccharides as thickening agents, not only in waterflooding operations but also in other applications where thickened solutions must be stored for extended periods of time. This is particularly true where thickening agents must be used in the tropics.

The superiority of the substituted heteropolysaccharides of the invention over thickening agents of the prior art can be seen by comparing the results obtained in an extended high temperature stability test. In this test, separate samples of water containing about 0.25 weight percent sodium chloride were thickened with 0.2 weight percent of a substituted heteropolysaccharide prepared by reacting formaldehyde with a polymer produced by the action of *Xanthomonas campestris* on raw sugar, with 2.0 weight percent of dextran, and with 0.2 weight percent of polyacrylic acid. The viscosity of each of the three viscous solutions was measured in 1:6 dilution in distilled water with the Brookfield viscometer at 80° F. The solutions were then aged for 43 days at a temperature of 150° F. Viscosity measurements were made at 80° F. at intervals during this period. It was found that the viscosity of the solution containing the substituted heteropolysaccharide changed only slightly. The viscosities of the solutions containing dextran and polyacrylic acid declined at such rapid rates that measurements were discontinued after 32 days and 22 days respectively. The data obtained are shown in Table III below.

Table III
STABILITY OF THICKENING AGENTS

| Aging Time, Days at 150° F. | Viscosity in Centipoises At 80° F. | | |
|---|---|---|---|
|  | Solution Containing Substituted Heteropolysaccharide | Solution Containing Dextran | Solution Containing Polyacrylic Acid |
| 0 | 27.0 | 26.6 | 90 |
| 5 | 28.6 | 17.0 | 73 |
| 12 | 28.8 | 15.3 | 25 |
| 22 | 26.0 | 13.5 | >8 |
| 32 | 23.0 | 15.2 | -- |
| 43 | 23.0 | -- | -- |

The above data illustrate the remarkable stability of aqueous solutions thickened with the substituted heteropolysaccharides of the invention. It can be seen that the viscosity of the substituted heteropolysaccharide solution had declined relatively little after 43 days; whereas, that of the dextran solution was only about half of the initial value after 32 days and that of the polyacrylic acid was less than one-tenth of the initial value after 22 days. It is thus clear that the thickening agents of the invention are much better suited for use in waterflooding and similar operations than either dextran or polyacrylic acid, thickening agents frequently advocated for use in such operations in the past.

What is claimed is:

1. A process for preparing an improved thickening agent which comprises fermenting an aqueous carbohydrate solution with bacteria of the genus Xanthomonas to produce a heteropolysaccharide and thereafter reacting said heteropolysaccharide with a saturated, unsubstituted aldehyde containing from one to about four carbon atoms per molecule.

2. A process as defined by claim 1 wherein said carbohydrate solution is a sugar solution.

3. A process as defined by claim 1 wherein said aldehyde is formaldehyde.

4. A process as defined by claim 1 wherein said bacteria are of the species *Xanthomonas campestris*.

5. A process for the production of a stable heteropolysaccharide which comprises preparing a sterile fermentation medium containing from about 1 weight percent to about five weight percent of a carbohydrate, from about 0.01 weight percent to about 0.5 weight percent of dipotassium acid phosphate, and from about 0.1 weight percent to about 10 weight percent of a bacteria nutrient; inoculating said medium with bacteria of the genus Xanthomonas; fermenting said medium under aerobic conditions; contacting the fermentate at a temperature in excess of about 150° F. with from about 0.5 weight percent to about 50 weight percent of a saturated, unsubstituted aldehyde containing from one to about four carbon atoms per molecule; and recovering a substituted heteropolysaccharide.

6. A process as defined by claim 5 wherein said substituted heteropolysaccharide is dried and recovered in powdered form.

7. A process as defined by claim 5 wherein said fermentation medium contains raw sugar.

8. A process as defined by claim 5 wherein said bacteria are of the species *Xanthomonas begoniae*.

9. A process as defined by claim 5 wherein said fermentate is contacted with said aldehyde in the presence of a mineral acid.

10. A substituted heteropolysaccharide produced by the fermentation of a carbohydrate by bacteria of the genus Xanthomonas and reaction of the resulting heteropolysaccharide with a saturated, unsubstituted aldehyde containing from one to about four carbon atoms per molecule.

11. A method for producing a viscous solution resistant to thermal degradation which comprises preparing an aqueous solution of a heteropolysaccharide formed by the action of bacteria of the genus Xanthomonas upon a carbohydrate, adding a saturated, unsubstituted aldehyde containing from one to four carbon atoms per molecule to said solution, and thereafter heating said solution to a temperature in excess of about 150° F.

12. A method for producing a viscous solution resistant to thermal degradation which comprises preparing an aqueous solution of a heteropolysaccharide formed by the action of bacteria of the genus Xanthomonas upon a carbohydrate, adding formaldehyde to said solution, and heating said solution containing formaldehyde to a temperature in excess of about 150° F.

13. A method as defined by claim 12 wherein formaldehyde is added to said solution in an amount sufficient to give a formaldehyde concentration of from about 0.5 to about 50%, based upon the total weight of solution.

14. A method as defined by claim 12 wherein said solution is heated to a temperature in the range between about 175° F. and about 250° F.

15. A method as defined by claim 12 wherein said aqueous solution is a solution of the heteropolysaccharide produced by the action of *Xanthomonas campestris* upon a sugar.

16. A method as defined by claim 12 wherein said aqueous solution is a solution of the heteropolysaccharide produced by the action of *Xanthomonas begoniae* upon a sugar.

No references cited.